United States Patent
Wynalda, Jr.

(10) Patent No.: US 9,426,977 B1
(45) Date of Patent: Aug. 30, 2016

(54) AROMATIC HUNTING LURE VAPORIZING DEVICE

(71) Applicant: Robert M. Wynalda, Jr., Comstock Park, MI (US)

(72) Inventor: Robert M. Wynalda, Jr., Comstock Park, MI (US)

(*) Notice: Subject to any disclaimer, the term of this patent is extended or adjusted under 35 U.S.C. 154(b) by 0 days.

(21) Appl. No.: 14/941,428

(22) Filed: Nov. 13, 2015

Related U.S. Application Data

(60) Provisional application No. 62/151,989, filed on Apr. 23, 2015, provisional application No. 62/156,023, filed on May 1, 2015, provisional application No. 62/163,603, filed on May 19, 2015.

(51) Int. Cl.
| | | |
|---|---|---|
| *F24F 6/00* | (2006.01) | |
| *A61H 33/06* | (2006.01) | |
| *F24F 6/08* | (2006.01) | |
| *A01M 31/00* | (2006.01) | |
| *F22B 1/28* | (2006.01) | |

(52) U.S. Cl.
CPC .......... *A01M 31/008* (2013.01); *F22B 1/284* (2013.01)

(58) Field of Classification Search
None
See application file for complete search history.

(56) References Cited

U.S. PATENT DOCUMENTS

| | | | |
|---|---|---|---|
| 2,609,230 A * | 9/1952 | Raleigh | A61L 9/14 239/47 |
| 3,046,192 A | 2/1959 | Bilyeu | |
| 3,112,645 A | 12/1963 | Glass | |
| 3,200,819 A | 8/1965 | Gilbert | |
| 3,207,441 A * | 9/1965 | Schreiber | F24F 3/16 222/187 |
| 4,159,672 A | 7/1979 | Garguilo et al. | |
| 4,163,038 A * | 7/1979 | Nishimura | A01M 1/2061 392/390 |
| 4,666,638 A | 5/1987 | Baker et al. | |
| 4,742,960 A * | 5/1988 | Bustillo | A61L 9/12 239/47 |
| 4,771,563 A * | 9/1988 | Easley | A01M 31/008 219/521 |
| 4,937,431 A * | 6/1990 | Jameson | A01M 31/008 239/59 |
| 5,094,025 A * | 3/1992 | Daniels | A01M 31/008 239/136 |
| 5,161,646 A | 11/1992 | Aurich et al. | |
| 5,305,541 A | 4/1994 | Simpson | |
| 5,307,584 A * | 5/1994 | Jarvis | A01M 31/008 239/51.5 |
| 5,359,801 A | 11/1994 | Mattucci et al. | |
| 5,429,271 A * | 7/1995 | Porter | A01M 1/2077 222/146.5 |

(Continued)

OTHER PUBLICATIONS

Screenshot from www.huntvape.com accessed Jan. 7, 2016 for CIRRUS wind indicator device, copyright 2016.

(Continued)

*Primary Examiner* — Thor Campbell
(74) *Attorney, Agent, or Firm* — Zollinger & Burleson Ltd.

(57) ABSTRACT

An aromatic hunting lure vaporizing and distribution device uses an electric heating element to rapidly vaporize a liquid and an integrated fan to distribute the vapor. The liquid can include a glycol or a water-glycol mixture. A scent material such as liquid or powdered deer urine or a pleasant scent that can be used as a room or automobile freshener is mixed with the liquid. The hunting lure vaporizing and distribution device selectively receives disposable cartridges that hold the aromatic hunting lure or scent liquid to be vaporized. In one configuration, the cartridge includes the liquid form of the lure without a heating element. In another configuration, the cartridge includes the electric heating element as well as the liquid form of the lure. In any of these configurations, the cartridge can be single use or refillable.

30 Claims, 6 Drawing Sheets

(56) References Cited

U.S. PATENT DOCUMENTS

| | | | |
|---|---|---|---|
| 5,547,616 A | 8/1996 | Dancs et al. | |
| 5,622,314 A * | 4/1997 | Eason | A61L 9/12 239/44 |
| 5,744,106 A * | 4/1998 | Eagle | A01M 1/2088 239/129 |
| 5,832,648 A * | 11/1998 | Malone | A01M 31/008 239/44 |
| 5,896,692 A | 4/1999 | Collora et al. | |
| 5,970,643 A | 10/1999 | Gawel, Jr. | |
| 6,038,805 A | 3/2000 | Smidtke | |
| 6,050,016 A | 4/2000 | Cox | |
| 6,240,248 B1 | 5/2001 | Fore | |
| 6,241,161 B1 * | 6/2001 | Corbett | A01M 31/008 222/187 |
| 6,443,434 B1 | 9/2002 | Prather | |
| 6,592,104 B2 * | 7/2003 | Cox | A01M 1/2033 261/26 |
| 6,610,254 B1 * | 8/2003 | Furner | A01M 1/2033 222/183 |
| 6,655,604 B2 | 12/2003 | Tuttobene, Jr. | |
| 6,745,950 B1 * | 6/2004 | Longo | A01M 31/008 239/145 |
| 6,820,363 B1 * | 11/2004 | Averette, Jr. | A01M 31/008 239/44 |
| 6,983,103 B1 * | 1/2006 | Parcher | A01M 31/004 222/146.5 |
| 7,133,605 B2 * | 11/2006 | Niemeyer | A61L 9/03 219/438 |
| 7,419,102 B2 * | 9/2008 | Harris, Jr. | A01M 1/2044 239/145 |
| 7,997,280 B2 | 8/2011 | Rosenthal | |
| 8,156,944 B2 | 4/2012 | Han | |
| 8,490,889 B2 | 7/2013 | Rydbom | |
| 9,320,300 B2 | 4/2016 | Hon | |
| 2004/0221841 A1 | 11/2004 | Herschel | |
| 2008/0244954 A1 | 10/2008 | Shannon | |
| 2009/0114228 A1 | 5/2009 | Kirschner | |
| 2009/0277972 A1 | 11/2009 | Kennon et al. | |
| 2009/0277973 A1 | 11/2009 | Kennon | |
| 2010/0031968 A1 | 2/2010 | Sheikh et al. | |
| 2010/0059601 A1 | 3/2010 | Bankers et al. | |
| 2010/0126505 A1 | 5/2010 | Rinker | |
| 2010/0242974 A1 | 9/2010 | Pan | |
| 2011/0005535 A1 | 1/2011 | Xiu | |
| 2011/0011396 A1 | 1/2011 | Fang | |
| 2011/0036346 A1 | 2/2011 | Cohen et al. | |
| 2012/0111347 A1 | 5/2012 | Hon | |
| 2012/0272968 A1 | 11/2012 | Kirschner | |
| 2014/0352630 A1 | 12/2014 | Messina | |
| 2015/0189855 A1 | 7/2015 | Norris | |
| 2015/0359230 A1 | 12/2015 | Messina | |
| 2016/0069924 A1 | 3/2016 | Norris et al. | |

OTHER PUBLICATIONS

Oct. 21, 2009, forum discussion on www.e-cigarette-forum.com titled "vaping and deer hunting????", 9 pages.
Nov. 8, 2014, forum discussion on www.vaportalk.com titled "Vaping and Deer Hunting", 22 pages.
Oct. 19, 2012, forum discussion on www.e-cigarette-forum.com titled "Vaping and deer hunting, anyone else?", 13 pages.
Jul. 1, 2010, forum discussion on www.e-cigarette-forum.com titled "Vaping and Hunting", 28 pages.
Jul. 10, 2010, forum discussion on www.e-cigarette-forum.com titled "Vaping and Hunting . . . Hunters Weigh in . . . ", 20 pages.
Aug. 12, 2014, forum discussion on www.archerytalk.com titled "Vaping while deer hunting", 16 pages.

* cited by examiner

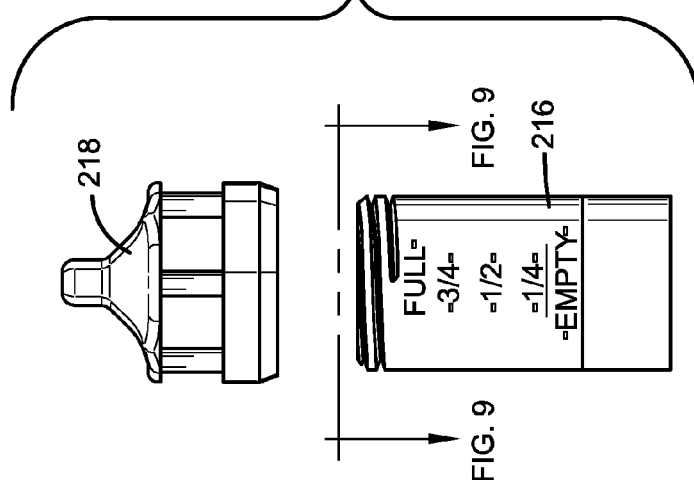
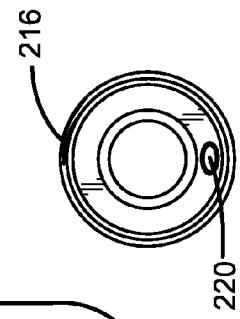
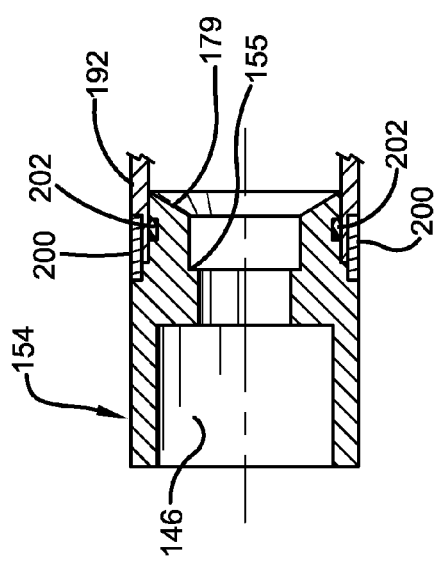
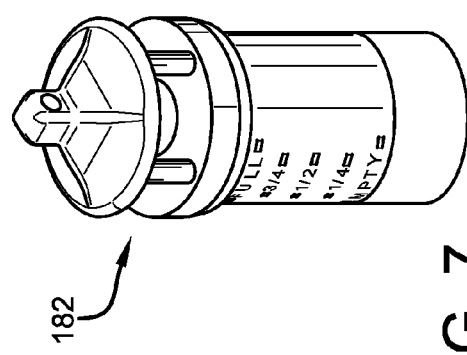

AROMATIC HUNTING LURE VAPORIZING DEVICE

CROSS REFERENCE TO RELATED APPLICATIONS

This application claims the benefit of U.S. Provisional Patent Application Ser. Nos. 62/151,989 filed Apr. 23, 2015, 62/156,023 filed May 1, 2015, and 62/163,603 filed May 19, 2015; the disclosures of each are incorporated herein by reference.

BACKGROUND OF THE DISCLOSURE

1. Technical Field

The disclosure generally relates to vaporizing devices used to make and distribute airborne scents such as those used as aromatic hunting lures. More particularly, the disclosure relates to an electric vaporizing device that vaporizes liquid aromatic compositions and distributes the vaporized scents to the atmosphere surrounding the device. Specifically, the disclosure relates to an electric vaporizer configured to selectively receive cartridges of aromatic liquids such as aromatic hunting lure liquid configured to be vaporizable upon exposure to a heating coil wherein the resulting vapor is distributed with air flow from an internal fan. One embodiment uses a timer to periodically active the device to distribute the scent over a selected distribution pattern.

2. Description of the Prior Art

Aromatic materials have long been used by hunters to lure or attract game animals toward a position within range of the hunter. Examples of aromatic materials include doe urine and sweet smelling items such as apple and corn. In some cases, a hunter spreads the smell of a buck in order to lure a different buck seeking to defend territory. Other urines and gland secretions are also used as well as naturally occurring smells from trees and bushes favored by game.

In certain instances, deer hunters, utilizing the aforementioned liquid urine, hunt near scrape marks which have been formed in the ground by the hooves of the deer crossing the territory. Deer scrape the ground to provide a location for defecation or urination, and consequently other deer are attracted to the odors emanating from previously formed scrapes. As a consequence, it is advantageous for hunters to distribute quantities of urine near the previously formed scrapes. A few drops of the liquid urine may be sprinkled in each of the scrapes within range, and in addition a bottle or vial containing some of the liquid urine may be left open on the ground, so that a portion of the liquid urine evaporates into the air to further distribute the aroma.

Unfortunately, individuals hunting in freezing conditions have found that the urine freezes after a certain time in the field, rendering the relatively expensive product useless. In addition, containers or vials which are left on the ground for vaporization of the liquid urine occasionally tip due to the influence of wind and spill the expensive liquid contents onto the earth. Another problem is that a liquid aromatic material has a strong scent immediately after being distributed which then tapers off over time. Hunters design a way to re-strengthen the scent without leaving a blind or stand position.

One solution to the problem of freezing lure is disclosed in U.S. Pat. No. 3,046,192 which uses a hand warmer to warm the lure. Other devices use a burning fuel to warm the material in order to increase the rate of evaporation. One device uses an electrically-power heater disposed within a wick to warm material drawn to the heater.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The disclosure provides a vaporizing and distribution device that uses an electric heating element to rapidly vaporize a scent material that is provided as a liquid to the heating element. The scent material can include a propylene glycol (PG), a vegetable glycerin (VG), a combination of PG and VG, or a combination of PG or VG and water. These substances are mixed with an aromatic material that can be added as a solid or a liquid. The aromatic material can be a hunting lure or a material having a smell that is pleasant to humans or a material that repels animals or insects. The solid aromatic material can be a dehydrated material such as dehydrated animal or game urine such as a deer urine, elk urine, bear urine, or other dehydrated glandular secretions. The liquid aromatic material can be the liquid forms of these materials or scented oils.

The disclosure provides a vaporizing and distribution device configured to selectively receive disposable cartridges that hold the scent material. In one configuration, the cartridge includes the liquid scent material without a heating element. In another configuration, the cartridge includes the electric heating element as well as the liquid scent material. In any of these configurations, the cartridge can be single use or refillable. In any of these configurations, the cartridge can hold the liquid scent material disposed around a centrally-disposed distribution outlet that directs vapor to a distributor that allows the vapor to be distributed around the entire perimeter of the device.

The disclosure provides scent material composition that includes a base that is readily vaporized by an electric resistive heater and an animal lure aromatic material which can be a dehydrated urine or an animal material such as gland secretions that attract game. Deer urine is provided as an example. The aromatic material also can be a pleasant-smelling material such as a fruit-based material, a flower-based material, or another pleasant-smelling plant or item such that the device may be used for an alternative purpose of freshening air in a room or the air in an automobile. These scents also may be used to cover the scents humans leave while entering or exiting hunting grounds.

The disclosure provides a vaporizer that includes a fan that creates an air flow used to distribute the vapor from the device. The device includes selective fan speeds.

The disclosure provides a vaporizer with a removable power source and a removable power source housing.

The disclosure provides an aromatic hunting lure distribution device having a timer and/or a controller chip that allows the distribution of the hunting lure at selected intervals based on time, temperature, or climate conditions. In one configuration, the user can program the timer and/or controller chip or change the settings of the controller chip in order to change the operation of the device.

The disclosure also provides a non-programmable hunting lure distribution device which has a fixed distribution timing and volume pattern. This may be combined with a manual trigger to allow for manual operation of the device.

The disclosure provides a vaporizing device having a power supply that is selectively connectable to the vaporizing device and other devices such as a flashlight, an electric device charger, a power adapter for a cell phone, or other devices operable from battery power.

The preceding non-limiting aspects, as well as others, are more particularly described below. A more complete understanding of the processes and the structures of the vaporizing device can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

BRIEF DESCRIPTION OF THE DRAWINGS

FIG. 6 is a section view of the burner holder.

FIG. 7 is a front elevation view of an alternative end cap.

FIG. 8 is an exploded view of the alternative end cap showing the pieces disassembled for refilling.

FIG. 9 is a view taken along line 9-9 of FIG. 8 showing the refill opening.

Similar numbers refer to similar parts through the specification.

DETAILED DESCRIPTION OF THE DISCLOSURE

The different configurations of the vaporizing device of the disclosure are indicated generally by the numeral 100 in the accompanying drawings. When assembled for use, each of these configurations generally includes a power source, a heating device, and a reservoir that contains a liquid scent material that vaporizes into an airborne scent that can be used as a lure designed to attract hunting game, as a repellant, or as an air freshener. Device 100 can be provided to the user without a power source with the power source being supplied by the end user. Some of the configurations include a fan that is used to create a flow of air that distributes the vaporized scent material from device 100. One configuration is operated by an on-off switch. Another configuration includes a timer that controls the operation of the device. An option is to provide a timer that is programmable by the user. The timer controls the creation and distribution of the vaporized scent material. One configuration provides a refillable liquid cartridge while another configuration provides a sealed liquid cartridge that is removed and replaced after depletion. The cartridge carries the liquid scent material that is vaporized. One configuration of the cartridge simply includes the liquid composition that is vaporized. Another configuration of the cartridge includes the liquid composition as well as the burner element. The cartridges are selectively connectable to the other components or another component of device 100 to allow the user to readily recharge the device for continued use. These general elements of device 100 may be used alone or in combination with each other and the other elements described below to define the different configurations of device 100.

Figure 1:
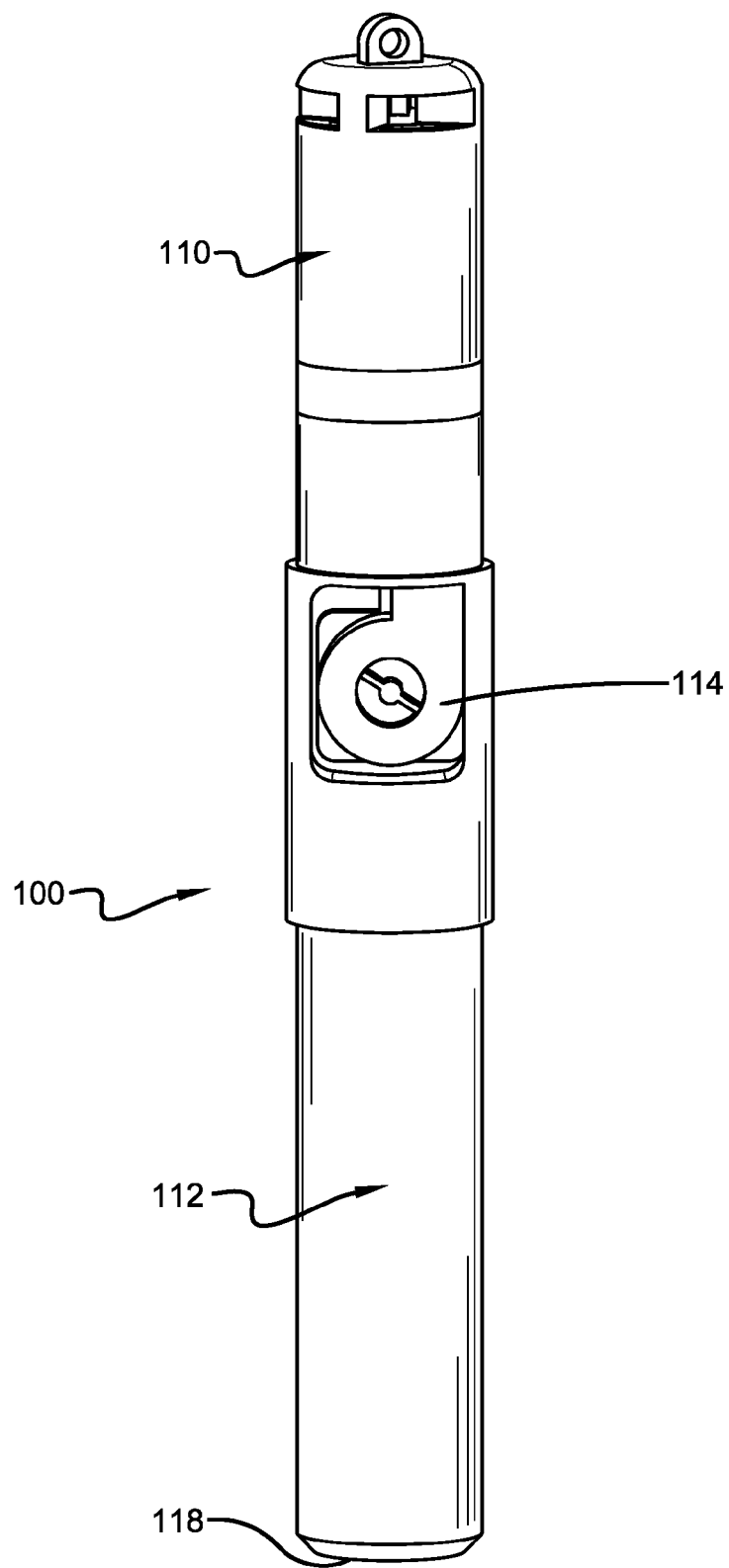
FIG. 1 is a rear perspective view of the device.
Figure 2:
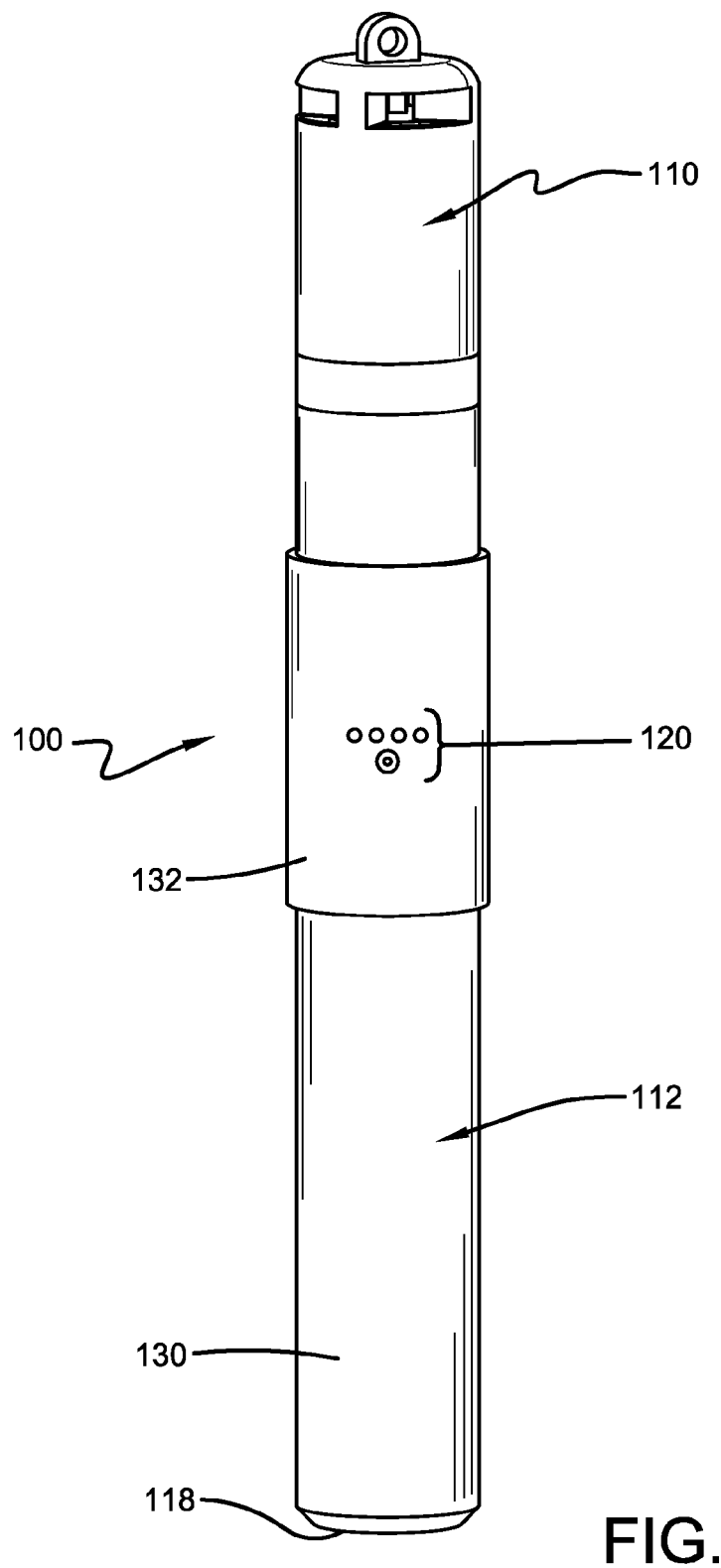
FIG. 2 is a front perspective view of a first configuration of the device.
Figure 3:
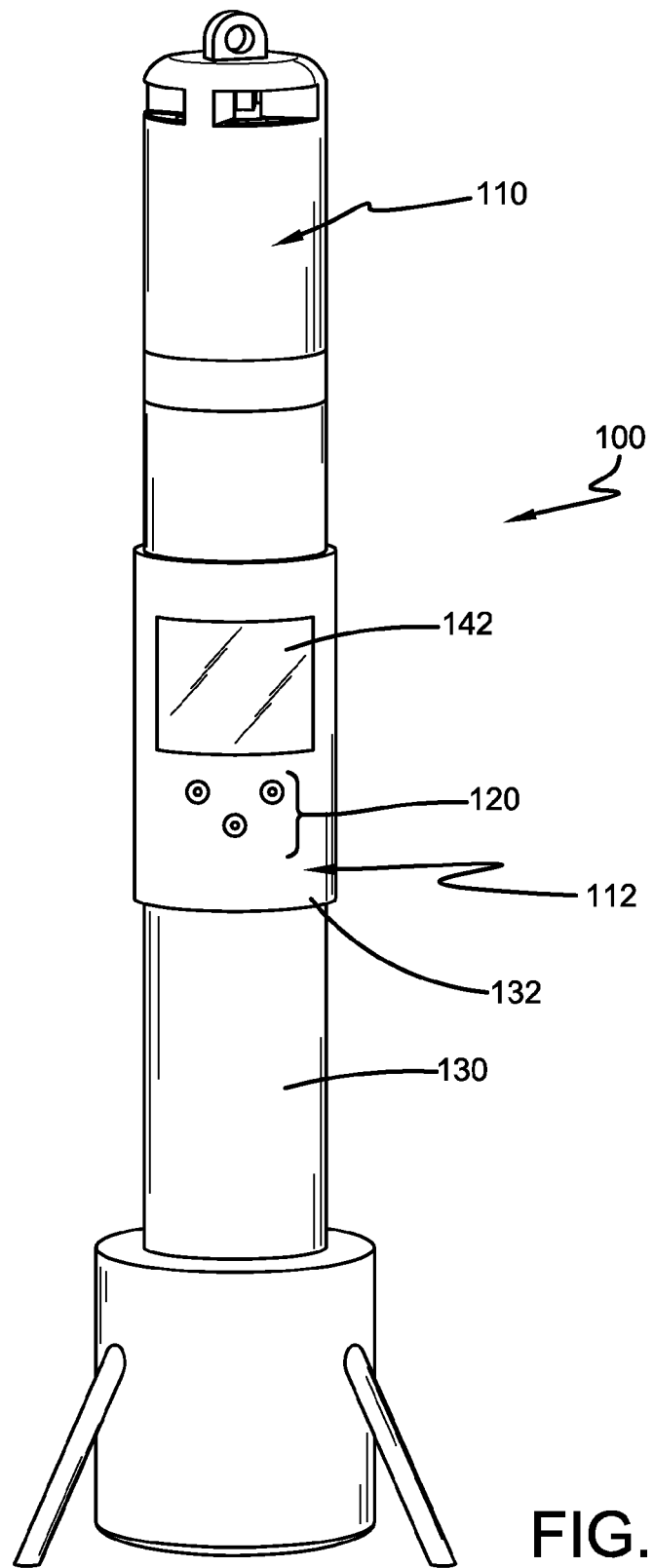
FIG. 3 is a front perspective view of a second configuration of the device used with a stand that can be used with either of the configurations.
Figure 4:
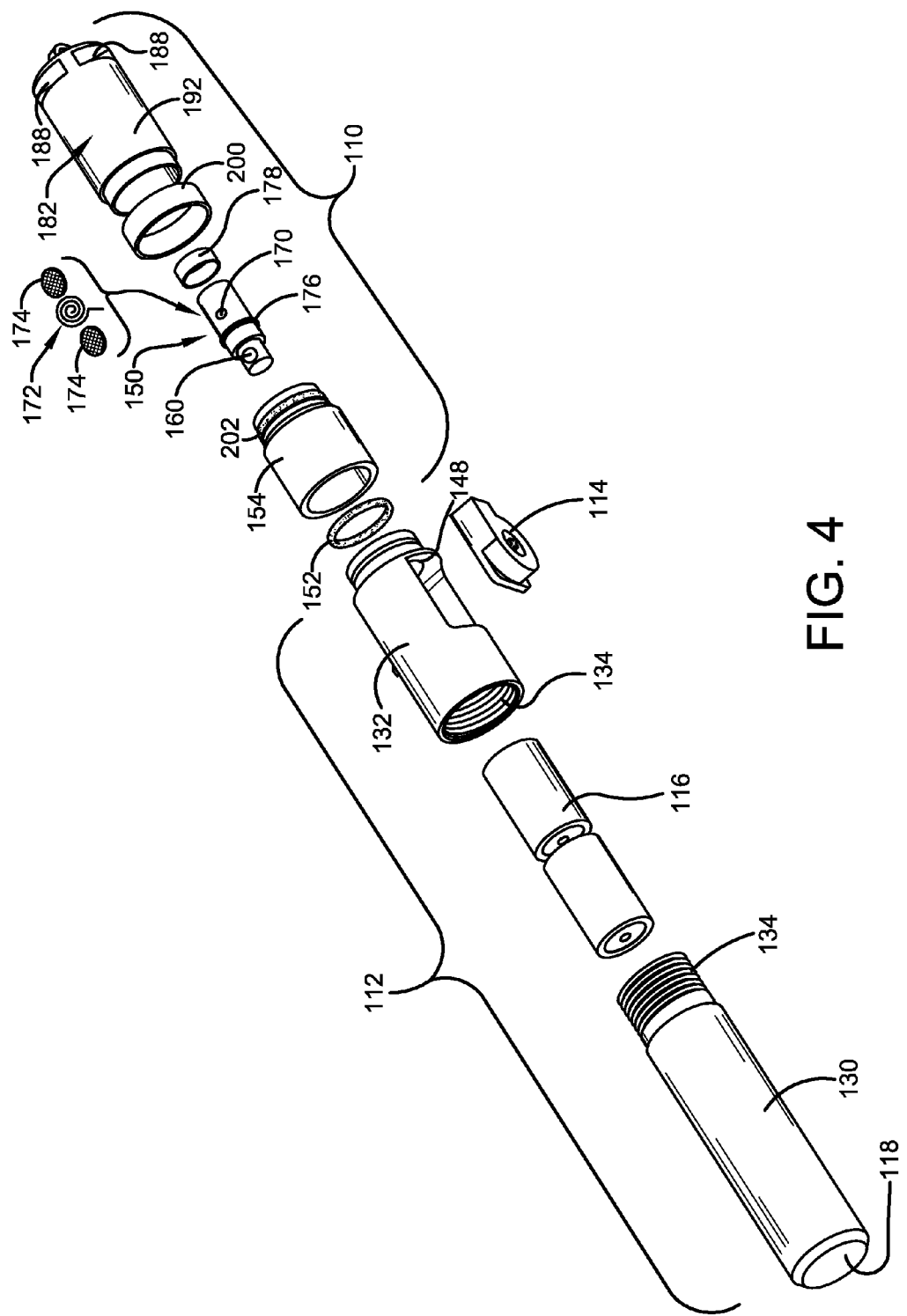
FIG. 4 is an exploded perspective view of the device.
Figure 5:
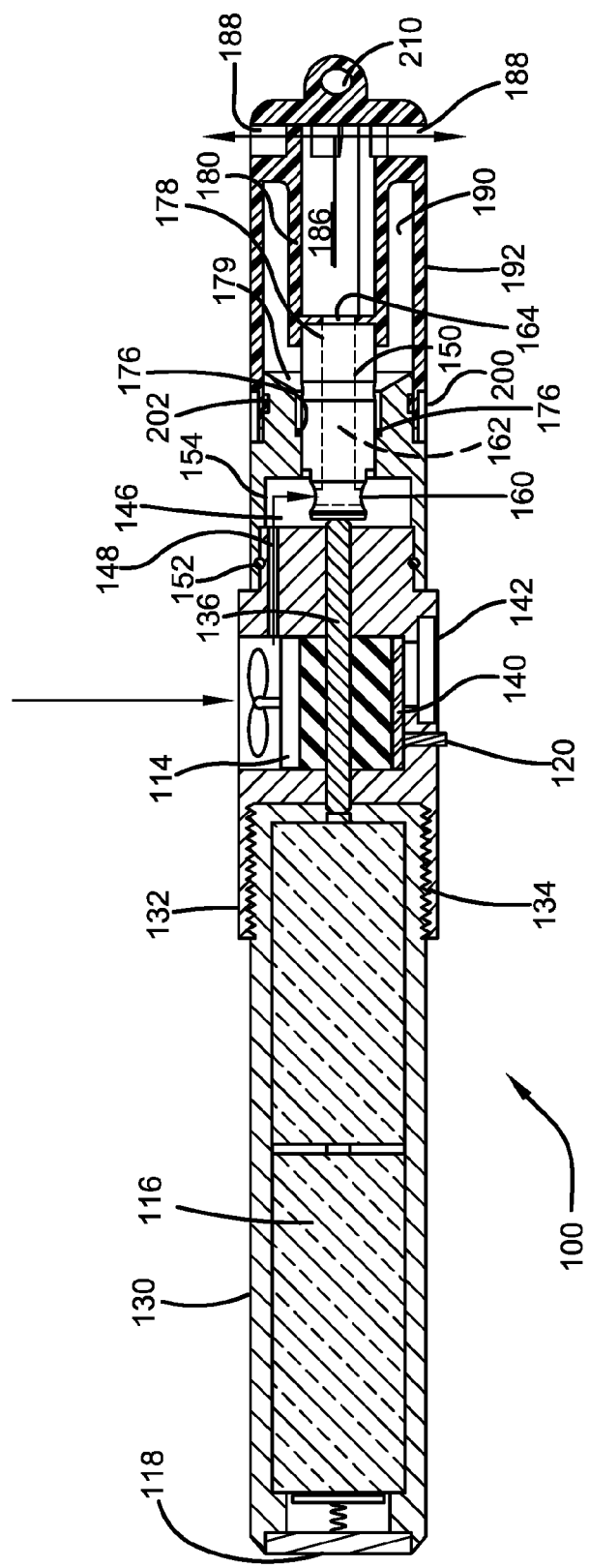
FIG. 5 is a section view of the device.

In the exemplary configurations of FIGS. 1-4, device 100 includes a removable and replaceable cartridge 110 and a base 112. Cartridge 110 carries the liquid scent material that is vaporized to form the airborne vaporized scent material which can be used as an aromatic hunting lure. In this exemplary configuration, cartridge 110 also includes a burner that vaporizes the liquid scent material. Base 112 carries a fan 114 that creates a flow of air that is delivered through cartridge 110 to distribute the vaporized scent material from device 100. Base 112 also carries a power source 116. Optionally, base 112 includes an on-off switch 118. Additional options carried by base 112 include a controller 120 that can be in the form of a preprogrammed timer that provides the user a selection of preset operating modes or a programmable controller that allows the user to customize the operation of device 100 to match the hunting conditions.

In the exemplary configurations of FIGS. 1-4, base 112 carries a removable power source 116 such as a battery which can be a disposable single-use battery or a rechargeable battery. Power source 116 is carried by a power source housing 130 that forms part of base 112 and can carry on-off switch 118. Switch 118 is located at the lower end of device 100 and is in the form of a push button style on-off switch or a twisting or rotating-style switch.

The connection between power source housing 130 and fan housing 132 of base 112 functions as the negative ground for the power circuit of device 100. The connection between housings 130 and 132 can be a threaded connection 134 or a snap-together connection. A seal in the form of an O-ring can be provided to make the connected water-resistant or water-proof.

In order to form this part of the electric circuit of device 100, electrically conductive elements are provided in base 112 that are in electrical contact with the negative side of power source 116. In the exemplary configuration, housings 130 and 132 are fabricated from an electrically conductive metal and the housings themselves define part of the electrical circuit. In other configurations, housings 130 and 132 can be fabricated from a material that is electrically insulating and conductive elements are be carried by each housing 130 and 132 to define the negative side of the electrical circuit.

The positive side of power source 116 is contacted by an electrical connector 136 that either extends into power source housing 130 or is recessed within fan housing 132. These positive and negative sides of the electrical circuit provide the electrical power for fan 114, controller 120 and the vaporizing coil of device 100.

The use of a removable power source 116 carried by housing 130 allows charged replacement power sources 116 to be quickly added to fan housing 132 as needed. The removable power source housing 130 allows optional attachments such as flashlight attachments, power adapters for charging phones, radio attachments, and other powered devices to be used with power source housing 130. In one optional configuration, switch 118 is disposed on the side of housing 130 and a flashlight attachment can be selective added to the end of device 100.

In one configuration, power source 116 is integrated into housing 130 such and is not readily removable from housing 130. Such a power source 130 can be a rechargeable-type of power source 116. The user can swap housings 130 in the field in a situation where the power is low. The housing can include a charging port.

Device 100 can be provided in a simple on-off configuration wherein device 100 forms and dispenses vapor when the users turns device 100 on and stops when the user turns device 100 off. Device 100 can be provided with controller 120 that provides operating configurations that are more useful for some hunting situations. In the configuration depicted in FIG. 2, controller 120 includes a single button and four indicator lights that indicate the operating condition of device 100. Each operating condition is preprogrammed for a different distribution timing pattern. For example, the first condition can be a long continuous distribution of vapor (such as ninety seconds) followed by ninety minutes of short bursts (such as ten seconds) spaced apart every three minutes. The second configuration can be set to distribute medium bursts (thirty seconds) at longer time intervals (every ten minutes) for an extended time (such as two hours). The third and fourth conditions can have other variations such as short-long-short and very long-very long-very long. In the configuration depicted in FIG. 3, programmable controller 120 allows the user to define the distribution pattern of device 100. Controller 120 allows the user to control the timing of the vapor distribution, the time intervals between distributions, and the volume of the vapor distribution. Controller 120 can include a programmable circuit board 140 that includes a timer. The settings of controller 120 can be changed through push buttons accessible to the user (three button are depicted as examples— more or fewer can be used). A visible screen 142 can be used to display the settings to the user. In other configurations, a wireless communications circuit is used to allow the user to communicate with controller 120 through WIFI or Bluetooth communications protocols such that device 100 can be set up through software on a user's phone. An exemplary setting for the operation of the device is to vaporize for three seconds and then turn off for ninety seconds when the sequence is repeated. This sequence can be set to repeat a number of times or for a length of time as desired by the user.

Fan housing 132 defines one or a plurality of air channels 148 for the air flow created by fan 114. Air channels 148 extends from the exit of fan 114 to the upper end of base 112. When cartridge 110 is connected, the outlet of air channel 148 is in communication with a plenum 146 that receives a lower end portion of the burner 150. The removable and replaceable cartridge 110 contains the liquid that is vaporized by device 100 and the burner 150 that, when powered, is adapted to vaporize a selected volume of the liquid. Burner 150 defines an air inlet 160 that is in fluid communication with plenum 146 when cartridge 110 is installed. The air flow from fan 114 pressurized plenum 146 causing air flow into inlet 160 and through an air flow channel 162 defined by burner 150 from inlet 160 to its outlet 164.

Before cartridge 110 is connected to fan housing 132, cartridge 110 is substantially sealed such that the user is not readily exposed to the liquid during the transport and storage of cartridge 110. A removable seal can be provided over the lower end of cartridge 110. This seal is either removed by the user or pierced by base 112 during the installation of cartridge 110. Another configuration only seals air inlets 160 with a removable or meltable seal. The upper end of cartridge 110 can be sealed with its own removable seal or the top portion of cartridge 110 can be rotated between a sealed condition and an open condition.

When cartridge 110 is installed, a gasket, seal, or O-ring 152 forms a seal between the burner holder 154 and the top of fan housing 132. The connection between burner holder 154 and fan housing 132 can be a snap fit, a threaded connection, or a slide and twist locking connection similar to a bayonet connection. In the configuration wherein the installation of cartridge 110 is designed to pierce the lower seal of cartridge 110, the remaining portions of that seal remain on cartridge 110 and form seal 152 when the cartridge 100 is fully seated on fan housing 132.

Burner 150 defines a liquid scent material inlet 170. Within burner 150 in fluid communication with both channel 162 and inlet 170 is a heating element 172 and a wick 174. Heating element 172 is an electric resistive heating-style element (burner coil) that creates heat when electric current is passed through element 172. Wick 174 limits the amount of liquid that is brought into contact or proximity with heating element 172. Wick 174 can be a screen having small openings or an absorbent material. Electricity is delivered to heating element 172 through burner 150 and the circuit is formed through burner holder 154.

Burner 150 is seated in burner holder 154 against an inner shoulder 155 defined by burner holder 154. This connection can be used to form the negative electrical connection between burner holder 154 and heating element 172. Burner 150 can be held in place by being sandwiched between shoulder 155 of holder 154 and end cap 182. A burner cap seal 178 forms a seal between burner 150 and end cap 182. Alternatively or in combination with the sandwiched fit, burner 150 can be held by a friction fit, a threaded connection, or a snap fit. Burner 150 defines a shoulder 176 that seats against inner shoulder 155 of burner holder 150. A seal is disposed between burner 150 and the inner surface of burner holder 154. This connection provides that air inlet 160 is in fluid communication with plenum 146 of burner holder 154. The upper end 179 of burner holder 154 is funnel shaped to direct the liquid into inlet 170.

Burner 150 extends to engage a central portion 180 of end cap 182. Central portion 180 defines a vapor distribution channel 186 of end cap 182. End cap 182 defines a plurality of vapor outlets 188 that allow the vapor to be distributed about the entire perimeter of the device.

End cap 182 defines a liquid holding chamber 190 that holds the liquid aromatic lure material. Inlet 170 of burner 150 is exposed to the liquid in chamber 190. Chamber 190 is defined between the outer surface of central portion and the inner surface of the outer wall 192 of end cap 182. Chamber 190 is thus substantially ring-shaped and surrounds vapor distribution channel 186. End cap 182 is mounted to burner holder 154 with a mounting collar 200 by threads, snap fit, adhesive, or weld/fusion. A seal such as an O-ring 202 can be used as needed.

End cap 182 can define a mounting hole 210 for a lanyard that keeps device 100 in a generally upright configuration so that any liquid in the liquid holding chamber 190 is disposed against the heating element 172 or the wick 174 for the heating element 172 by gravity.

Cartridge 110 is used and discarded. Heating element 172 eventually burns out which allows burner 150 to be disposed with cartridge 110. Disposable cartridges 110 allow the user of device 100 to stay out of contact with the liquid lure and does away with the problem of refilling device 100. When device 100 is empty, the user simply removes cartridge 100 by disconnecting burner holder 154 from fan housing 132. A new cartridge 110 is added and device 100 is ready to use.

In an alternative configuration, the replacement cartridge does not include burner 150. In this configuration, end cap 182 is removed after it is used and a full end cap 182 is replaced onto burner holder 154.

In another alternative configuration, end cap 182 has a refill opening that allows the user to refill liquid into chamber 190 as needed. This configuration is depicted in FIGS. 7-9 wherein end cap 182 is provided in first 216 and second 218 portions with a refill opening 220 being defined by the lower portion. The second portion screws onto the first portion and seals opening 220 when tightened.

In each of the embodiments describe above, the liquid scent material that is being vaporized is a combination of a glycol substance with an aromatic material. The aromatic material can be a solid or liquid animal lure substance. The glycol substance can be a propylene glycol, a vegetable glycerin, a combination of both, and/or a combination of these with water. The animal lure aromatic material can be a liquid or solid animal urine or glandular secretion. The solid materials can be made by dehydration. In any of these combinations, water can be added as needed. The dehydrated urine can be formed by freeze drying, flash drying liquid urine, or otherwise dehydrating the liquid urine to form the additive to the glycol. The aromatic material can be designed to repel animals or insects such as a predator smell or a citronella. The aromatic material can be a pleasant-smelling material that one can use to freshen room air or an automobile. These aromatic materials can be clean-smelling materials, flower-based materials, fruit-based materials, pleasant-smelling food materials, pleasant-smelling outdoor smells, spices, tropical smells, and others enjoyable to human users. These can be provided as oils or powders and mixed with the glycol.

Device 100 has the advantage of only vaporizing the liquid scent material on demand. The device does not waste the liquid scent material by continuously vaporizing unless the user selects continuous operation as an option. The device will function in cold weather and the vaporized glycol-based vapor substance hangs in the air and does not distribute itself in the air as fast as other scent materials. The electric heating element does not create any additional fuel scent through a combustion process. The removable and replaceable cartridges keep the scent fresh and allow the user to readily refill the device without skin contact with the scent liquid. There is also no risk of spilling the liquid. The user can program the device to automatically freshen the scent at intervals.

An optional alternative use for the device is to attach a scent cartridge to the device that creates a pleasant smelling vapor for use in deodorizing a vehicle, a house, clothing, and the like. An advantage here is that by using the removable cartridge, there is no deer urine scent left on the device when a pleasant smelling scent is installed. This is especially true when the cartridges carry their own burner coils. As such, the same device used to distribute the deer urine smell can also be used to distribute a pleasant smelling vapor—such as a vanilla—for the hunter's vehicle on the drive home.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the descriptions and illustrations of the exemplary configurations are examples and the claimed invention is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. An electric liquid vaporizing device for vaporizing a liquid scent material into an airborne vapor; the device comprising:
   a base carrying a power source and a fan; the base including a power source housing and a fan housing; the power source housing carrying the power source; the fan housing being carried by the fan housing; and the power source housing being removable from the fan housing;
   a cartridge removably carried by the base; the cartridge carrying a liquid scent material and an electric heating element adapted to vaporize portions of the liquid scent material that contact the electric heating element when the electric heating element is powered;
   the electric heating element being carried by a burner; the burner defining an air flow channel having an inlet and an outlet; the burner also defining a liquid scent material inlet; the inlet of the air flow channel being in fluid communication with the fan;
   the base carrying the fan defining an air flow channel having an outlet; the base and cartridge cooperating to define a plenum with the outlet of the air flow channel of the base and the inlet of the air flow channel of the burner being in fluid communication with the plenum; and
   the cartridge defining a vapor outlet in fluid communication with the fan.

2. The device of claim 1, wherein the liquid scent material includes an animal lure aromatic material and at least one of a propylene glycol and a vegetable glycerin.

3. The device of claim 1, wherein the power source housing is removably connected to the fan housing with a threaded connection.

4. The device of claim 1, further comprising an electrical connector that extends through the fan housing to connect the power source to the burner.

5. An electric liquid vaporizing device for vaporizing a liquid aromatic hunting lure into an airborne vapor; the device comprising:
   a base carrying a power source and a fan;
   a cartridge removably carried by the base; the cartridge carrying a liquid scent material and an electric heating element adapted to vaporize portions of the liquid scent material that contact the electric heating element when the electric heating element is powered;
   the cartridge defining a vapor outlet in fluid communication with the fan;
   the liquid scent material including an animal lure aromatic material and at least one of a propylene glycol and a vegetable glycerin; and
   the cartridge defining a liquid holding chamber that surrounds a portion of a vapor distribution channel; the vapor distribution channel terminating at the vapor outlet.

6. The device of claim 5, wherein the electric heating element is carried by a burner; the burner defining a liquid scent material inlet; the burner extending into the vapor distribution channel and the liquid holding chamber is in fluid communication with the liquid scent material inlet.

7. The device of claim 6, further comprising a wick carried by the burner between the electric heating element and the liquid scent material inlet.

8. The device of claim 5, further comprising a timer that selectively powers the electric heating element to vaporize the liquid scent material.

9. The device of claim 5, further comprising an on/off switch that controls delivery of power from the power source to the electric heating element.

10. The device of claim 1, further comprising a timer that selectively powers the electric heating element to vaporize the liquid scent material.

11. The device of claim 1, further comprising an on/off switch that controls delivery of power from the power source to the electric heating element.

12. The device of claim 1, wherein the liquid scent material includes an aromatic material and at least one of a propylene glycol and a vegetable glycerin.

13. The device of claim 1, wherein the cartridge defines a plurality of vapor outlets that allow the vapor to be distributed about the entire perimeter of the device.

14. The device of claim 5, wherein the base includes a power source housing and a fan housing; the power source housing carrying the power source; the fan housing being carried by the fan housing; and the power source housing being removable from the fan housing.

15. The device of claim 14, wherein the power housing is removably connected to the fan housing with a threaded connection that allows the power housing to be used with powered attachments such as a flash light.

16. The device of claim 5, wherein the cartridge defines a plurality of vapor outlets that allow the vapor to be distributed about the entire perimeter of the device.

17. An aromatic scent cartridge for use when hunting game that is removably and replaceably connected to a vaporizing device base; the cartridge comprising:
a cartridge body defining a liquid holding chamber; a liquid scent material disposed in the liquid holding chamber; the liquid scent material including a game animal lure aromatic material and at least one of a propylene glycol and a vegetable glycerin;
the game animal lure aromatic material including one of a game animal urine and glandular secretion;
a burner that defines an air flow channel having an inlet and an outlet;
the burner defining a liquid scent material inlet in fluid communication with the liquid holding chamber;
the burner carrying an electric heating element in fluid communication with the air flow channel defined by the burner; the electric heating element being adapted to vaporize portions of the liquid scent material that contact the electric heating element when the electric heating element is powered;
the cartridge body defining a vapor outlet in fluid communication with the outlet of the air flow channel defined by the burner; and
the liquid holding chamber surrounding a portion of a vapor distribution channel; the vapor distribution channel terminating at the vapor outlet.

18. The device of claim 17, wherein the burner extends into the vapor distribution channel.

19. The device of claim 17, wherein the cartridge body defines a plurality of vapor outlets that allow the vapor to be distributed about the entire perimeter of the device.

20. The device of claim 19, wherein the cartridge body includes first and second portions that are joined together with a threaded connection; the first portion defining the liquid holding chamber.

21. The device of claim 20, wherein the first portion of the cartridge body defines a refill opening; the second portion of the cartridge body sealing the refill opening when the first and second portions are joined together to form the cartridge body.

22. An electric liquid vaporizing device for vaporizing a liquid scent material into an airborne vapor and distributing the airborne vapor from the device; the device comprising:
a body carrying an electric power source, a vapor distribution airflow generator, a liquid scent material holding chamber; and an electric heating element disposed to contact the liquid scent material;
the vapor distribution airflow generator adapted to selectively create a vapor distribution airflow adapted to carry vapor out of the body;
the liquid scent material holding chamber carrying a vaporizable liquid scent material; the vaporizable liquid scent material including one of a propylene glycol and vegetable glycerin;
the electric heating element adapted to vaporize portions of the liquid scent material that contact the electric heating element when the electric heating element is powered; and
the device having a vapor outlet in fluid communication with the electric heating element and the airflow generator such that the vapor distribution airflow can move vapor generated by the electric heating element through the vapor outlet.

23. The device of claim 22, wherein the electric heating element is carried by a burner; the burner defining a burner airflow channel having an inlet and an outlet; the burner also defining a liquid scent inlet; the inlet of the burner air flow channel being in fluid communication with the airflow generator; and the outlet of the burner air flow channel being in fluid communication with the vapor outlet.

24. The device of claim 23, wherein the portion of the body carrying the airflow generator defines a plenum with the inlet of the burner air flow channel being in fluid communication with the plenum.

25. The device of claim 23, wherein the body includes a funnel-shaped portion that defines a portion of the liquid holding chamber; the funnel-shaped portion adapted to feed the liquid scent material into the liquid scent material inlet of the burner.

26. The device of claim 22, wherein the body includes a removable cap that allows the liquid holding chamber to be refilled without separating the liquid holding chamber from the airflow generator.

27. The device of claim 22, wherein the device defines a plurality of vapor outlets that allow the vapor to be distributed about the entire perimeter of the device.

28. The device of claim 27, wherein the body includes first and second portions that are joined together with a threaded connection; the first portion defining the liquid holding chamber; the first portion of the cartridge body defining a refill opening; the second portion of the cartridge body sealing the refill opening when the first and second portions are joined together to form the cartridge body.

29. The device of claim 22, further comprising a timer that selectively powers the electric heating element to vaporize the liquid scent material.

30. The device of claim 22, further comprising an on/off switch that controls delivery of power from the power source to the electric heating element.

* * * * *